UNITED STATES PATENT OFFICE.

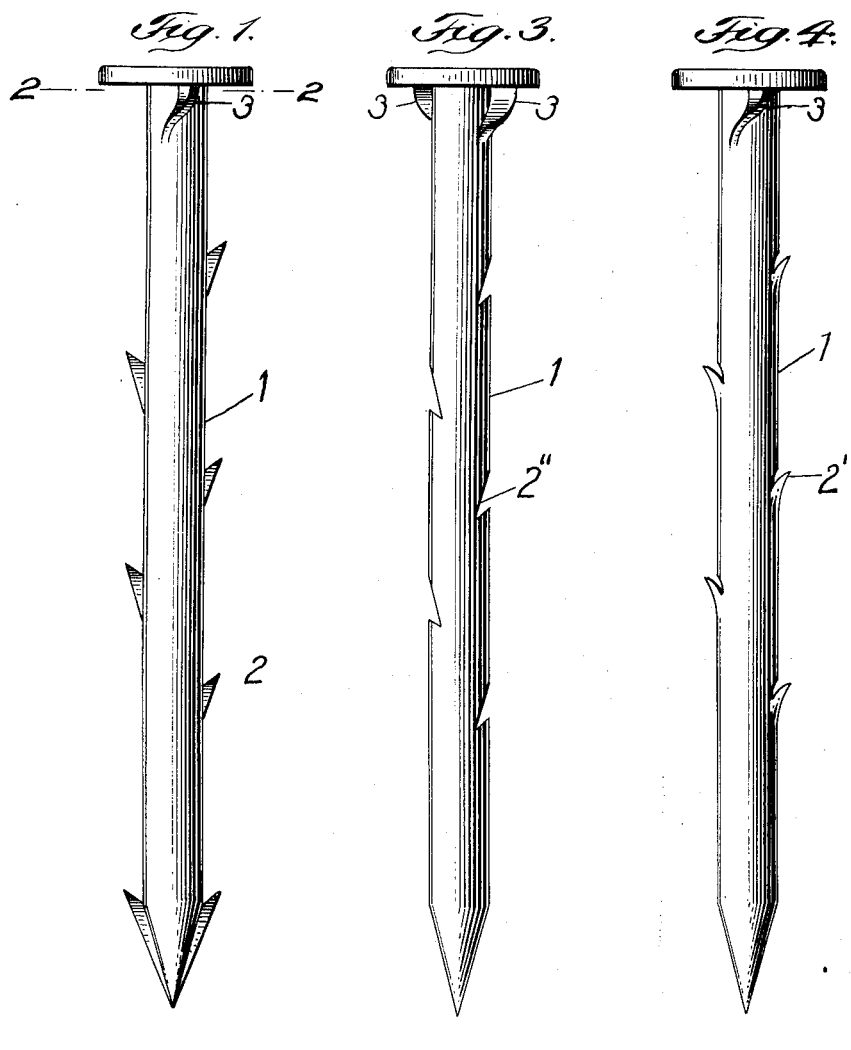
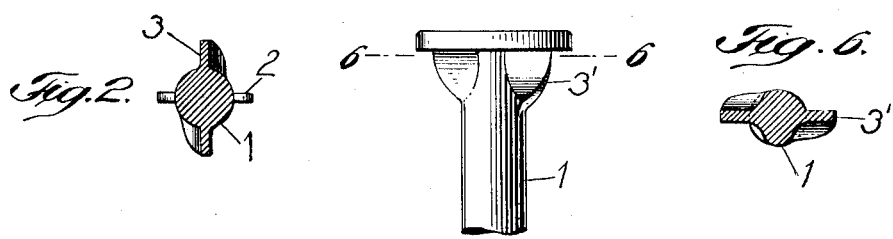

GONZALO O'NEILL, OF NEW YORK, N. Y.

NAIL OR DRIVEN FASTENING.

1,100,252.   Specification of Letters Patent.   Patented June 16, 1914.

Application filed June 27, 1913. Serial No. 776,041.

*To all whom it may concern:*

Be it known that I, GONZALO O'NEILL, a citizen of the United States, residing at New York city, in the county of Bronx and State of New York, have invented new and useful Improvements in Nails or Driven Fastenings, of which the following is a specification.

This invention relates to nails or driven fastenings and has for its object to provide a simple form of nail which when once driven in cannot easily be withdrawn. To accomplish this purpose, I provide a nail having retaining means upon its shank. The nail is so formed that it enters the wood without turning until almost entirely driven in and then turns slightly, thus embedding the retaining means in the wood and making it practically impossible to withdraw the nail.

The accompanying drawings illustrate various forms of nails embodying my invention.

Figures 1, 3 and 4 are side views of nails embodying my invention; Fig. 2 is a section on line 2—2 of Fig. 1; Fig. 5 is a partial side view of a nail embodying my invention; Fig. 6 is a section on line 6—6 of Fig. 5.

The nail shown in Fig. 1 has a round shank 1. Upon this shank are retaining means which consist of the elements 2, here shown as wedge-shaped projections. Upon the nail under the head are helical ridges 3. The operation of this nail is as follows: When it is driven into the wood, it enters without turning until the ridges 3 reach the surface of the wood. When this happens, these ridges cause the nail to rotate through an angle of about ninety degrees. Prior to this rotation of the nail each element of the retaining means takes, as the nail enters the wood, a course which is approximately a straight line parallel to the shank; and upon the rotation of the nail each element of the retaining means is finally embedded in the wood at one side of and out of line with the course which it has followed prior to the rotation. The result of this is that the nail cannot be withdrawn without breaking away some of the wood.

Numerous changes may be made in the form of nail shown in Fig. 1 without departing from my invention. In Figs. 3 and 4 I have shown various forms of retaining means, which may be substituted for the wedge-shaped projections shown in Fig. 1. In Fig. 4 I have shown projections which are made by forcing out some of the metal of the shank so as to form the burs 2'. In the form shown in Fig. 3 the retaining means are the indentations 2''.

Various equivalents may be substituted for the helical ridges 3 shown in Figs. 1, 2, 3, and 4. Thus, in Fig. 5, I have shown ridges 3', which are formed by flattening and twisting a portion of the shank. I have also found that means for causing the nail to rotate may be made by simply twisting the extreme upper part of the shank. Even where the shank is perfectly round I find that such twisting will produce helical irregularities in the surface of the shank which will cause the nail to rotate when completely driven in.

My invention is applicable to tacks, brads, spikes, and all other forms of nails.

What I claim is:—

1. A nail having a shank, retaining means consisting of elements each extending a portion of the distance around the circumference of the shank on said shank, and means near the head of the nail for causing it to rotate when driven in.

2. A nail having a shank, irregularities on the surface of said shank each extending a portion of the distance around the circumference of the shank constituting retaining means, and means near the head of the nail for causing it to rotate when driven in.

3. A nail having a round shank, irregularities on the surface of said shank each extending a portion of the distance around the circumference of the shank constituting retaining means, and means near the head of the nail for causing it to rotate when driven in.

4. A nail having a shank, helical ridges on said shank near the head end and retaining means on said shank consisting of irregularities in the surface of said shank.

5. A nail having a round shank, helical ridges on the shank near the head end, and wedge-shaped projections on the shank tapering toward the point of the nail.

6. A nail having a shank which is twisted near the head end and round the remainder of its length, and irregularities on the surface of the round portion of said shank constituting retaining means.

Signed at New York city, in the county of New York and State of New York, this 11th day of June, 1913.

GONZALO O'NEILL.

Witnesses:
 HERMAN GUSTOW,
 JANUS PARKER.